US008988343B2

(12) United States Patent
Fei et al.

(10) Patent No.: US 8,988,343 B2
(45) Date of Patent: Mar. 24, 2015

(54) METHOD OF AUTOMATICALLY FORMING ONE THREE-DIMENSIONAL SPACE WITH MULTIPLE SCREENS

(71) Applicant: Panasonic Corporation, Osaka (JP)

(72) Inventors: Yue Fei, San Jose, CA (US); Andrea Melle, Mountain View, CA (US); David Kryze, Campbell, CA (US)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 91 days.

(21) Appl. No.: 13/853,767

(22) Filed: Mar. 29, 2013

(65) Prior Publication Data

US 2014/0293017 A1   Oct. 2, 2014

(51) Int. Cl.
*G09G 5/00* (2006.01)
*H04N 13/04* (2006.01)
(Continued)

(52) U.S. Cl.
CPC ........ *H04N 13/0497* (2013.01); *G02F 1/13336* (2013.01); *G06F 3/01* (2013.01); *H04N 13/0007* (2013.01); *H04N 13/0425* (2013.01);
(Continued)

(58) Field of Classification Search
CPC ............... H04N 13/042; G06F 3/1446; G09G 2340/0407; G09G 5/14
USPC ............. 345/8, 101–107, 156, 173, 214, 420, 345/581, 589, 629–639, 685, 690; 359/844; 715/850, 854; 348/118, 14.01; 382/103, 165, 154, 255; 455/414.1, 455/450, 556.1
See application file for complete search history.

(56) References Cited

U.S. PATENT DOCUMENTS 6,330,356 B1 * 12/2001 Sundareswaran et al. .... 382/154
8,131,800 B2 * 3/2012 Bagley et al. ................. 709/204
(Continued)

FOREIGN PATENT DOCUMENTS

| WO | 2009/109785 A2 | 9/2009 |
| WO | 2009/122214 A2 | 10/2009 |
| WO | 2011/044936 A1 | 4/2011 |

OTHER PUBLICATIONS

"VisCube: Multi-Screen Immersive 3D Display," product brochure, Visbox, Inc., www.visbox.com, accessed Mar. 28, 2013.
(Continued)

*Primary Examiner* — Prabodh M Dharia
(74) *Attorney, Agent, or Firm* — Harness, Dickey & Pierce, P.L.C.

(57) ABSTRACT

Multiple electronic displays are arranged to define an ensemble of the user's choosing. The processor generates and displays a uniquely encoded emblem encoding a unique identifier for that display. A camera captures at least one image of the ensemble so that the encoded emblem for each display is captured. The captured images are then processed to extract the following attributes: a) unique identifier of the display; b) position of the encoded emblem relative to the reference coordinate system; and c) pointing direction of the encoded emblem relative to the reference coordinate system. The processor collectively processes the attributes for each of the emblem images to compute for each display a transformation matrix that selects a portion of the image data for display on that monitor and performs pointing direction correction so that the information presented on that display appears spatially consistent with the information presented on the other displays.

21 Claims, 9 Drawing Sheets

(51) Int. Cl.
*G02F 1/1333* (2006.01)
*G06F 3/01* (2006.01)
*G06F 3/14* (2006.01)
*G06F 3/03* (2006.01)
*H04N 13/00* (2006.01)

(52) U.S. Cl.
CPC ....... *H04N13/0429* (2013.01); *H04N 13/0468* (2013.01); *G06F 3/1446* (2013.01); *G06F 3/012* (2013.01); *G06F 3/0325* (2013.01)
USPC ............................ 345/156; 345/214; 345/581

(56) References Cited

U.S. PATENT DOCUMENTS

| | | | | |
|---|---|---|---|---|
| 8,422,777 | B2 * | 4/2013 | Aller | 382/165 |
| 8,768,313 | B2 * | 7/2014 | Rodriguez | 455/414.1 |
| 8,805,110 | B2 * | 8/2014 | Rhoads et al. | 382/255 |
| 8,886,206 | B2 * | 11/2014 | Lord et al. | 455/450 |
| 2004/0085256 | A1 * | 5/2004 | Hereld et al. | 345/1.1 |
| 2008/0211825 | A1 * | 9/2008 | Sunakawa et al. | 345/581 |
| 2011/0032365 | A1 * | 2/2011 | Yett | 348/207.1 |
| 2012/0057006 | A1 | 3/2012 | Joseph et al. | |
| 2013/0259304 | A1 * | 10/2013 | Aller | 382/103 |
| 2013/0273968 | A1 * | 10/2013 | Rhoads et al. | 455/556.1 |

OTHER PUBLICATIONS

Lombardo, Jean-Christophe, et al., "Immersive Space 'Gouraud-Phong' at INRIA Sophia Antipolis-Mediterranee open for Collaboration," ERCIM News, No. 84, Jan. 2011, pp. 52-53.

Boyle, Rebecca, "MIT Software Easily Stitches Together Any Display Screens into 'Junkyard Jumbotron,'" http://www.popsci.com/diy/article/2011-03/mit-software-stitches-together-multiple-display-screens-junkyard-jumbotron, posted Mar. 15, 2011.

* cited by examiner

METHOD OF AUTOMATICALLY FORMING ONE THREE-DIMENSIONAL SPACE WITH MULTIPLE SCREENS

FIELD

The present disclosure relates generally to computer graphics and video display technology. More particularly, the disclosures relates to the display of three-dimensional images using multiple display screens simultaneously.

BACKGROUND

This section provides background information related to the present disclosure which is not necessarily prior art.

Current three-dimensional display technology allows the user to have a three-dimensional viewing experience by separately displaying image data for the left eye and right eye, respectively. Conventionally, the user wears special glasses that are designed to selectively filter the left and right information so that each eye sees only the visual image for that eye's vantage point. There are a variety of different filtering techniques. Some use different colored lenses for each eye; some use different polarizations for each eye; and some multiplex the image in synchronism with image-blanking lenses in the glasses so that each eye receives only the visual information intended for it.

In most situations, this 3D experience is provided using a single display screen. In such case, the signal processing needed to supply the left and right images is fairly straightforward. The visual image data for each eye are separately processed by the appropriate filter or multiplex process and the processed data are then fed to the display device.

There are applications, however, where it would be desirable to offer a viewing experience using multiple displays or monitors. Examples of such applications might include panoramic theaters, trade show display kiosks, lecture halls and the like.

Physically setting up and interconnecting multiple displays to work in concert has traditionally required a painstaking setup process that is very technical, needs special tools and is very time-consuming. This setup process is further complicated when 3D viewing is desired because the precise position of each display must be accurately taken into account in order to properly render the left and right eye images.

SUMMARY

This section provides a general summary of the disclosure, and is not a comprehensive disclosure of its full scope or all of its features.

The present disclosure eliminates the tedious setup process by providing a system and computer-implemented apparatus that allows the location of each monitor within the ensemble to be automatically discovered, with its pointing direction or attitude and physical location relative to other monitors being automatically calculated. In one embodiment, the monitors are equipped with cameras and are able to automatically discover themselves.

In accordance with one aspect, the method of presenting information across multiple electronic displays involves first arranging multiple electronic displays to define an ensemble. The arrangement can be at the user's discretion, as the apparatus and method learns the arrangement, generating and displaying on each display a uniquely encoded emblem that expresses or encodes a unique identifier for that display. At least one digital image of the ensemble is captured so that the encoded emblem for each display is captured. A reference coordinate system is defined corresponding to the space occupied by the ensemble of electronic displays.

Next, each of the captured encoded emblem images is processed by the computer system to extract the following attributes:
 a) the unique identifier of the display;
 b) the position of the encoded emblem relative to the reference coordinate system; and
 c) the pointing direction of the encoded emblem relative to the reference coordinate system.

The information to be presented as image data to be displayed across the ensemble of displays is then supplied or input to the processor. The processor collectively processes the attributes for each of the encoded emblem images to compute for each display a transformation matrix that selects a portion of the image data for display on that monitor and that performs pointing direction correction so that the information presented on that display appears spatially consistent with the information presented on the other displays.

In this way, the computer system automatically learns or discovers the positions and orientations of each of the displays, and then uses this information to generate transformation matrices that are uniquely configured for each display, given its discovered location, pointing direction and other information about the display (such as the display size and resolution).

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1A:
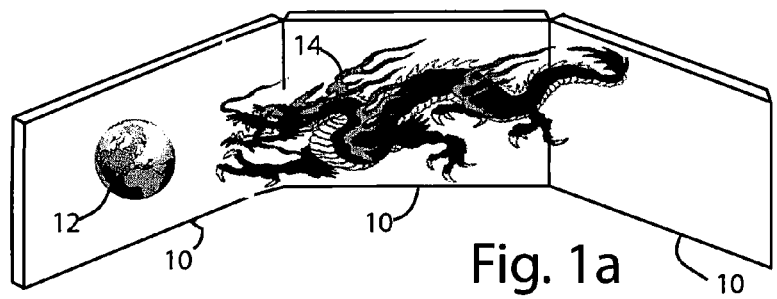
FIGS. 1a-1d depict four exemplary use cases where the disclosed method can be used.

Referring to FIGS. 1a-1d, four different use cases of the disclosed method are illustrated. In FIG. 1a, three display devices 10 are arranged to generally define a panoramic ensemble onto which computer graphic images are displayed. In the illustrated embodiment of FIG. 1a, note that the depiction of a globe at 12 occupies only a single display device, whereas the depiction of the dragon 14 stretches across all three display devices. The methods and system described herein are used to determine the proper transformation matrices required to render these visual images properly, given the position and orientations of the respective displays or monitors. As will be seen, the disclosed technique does not require the displays to be carefully positioned in any known locations. On the contrary, the displays can be simply placed in convenient locations. The disclosed system and method is then used to ascertain the display positions and orientations automatically and then compute the needed transformation matrices.

Figure 1B:
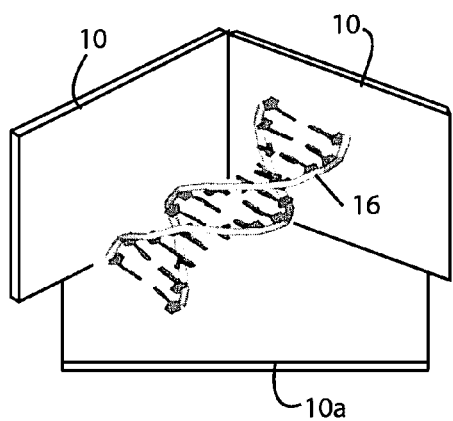

FIG. 1b shows another ensemble of displays 10. In this depiction, two of the displays are positioned at approximately right angles to one another and are then both positioned above a third display 10a that is positioned on the flat, that is, in a plane orthogonal to the other two monitors. In the embodiment illustrated in FIG. 1b, the image being displayed is a computer graphic image representing a section of DNA molecule, made to appear as if it is floating in the space in front of and above the displays.

Figure 1C:
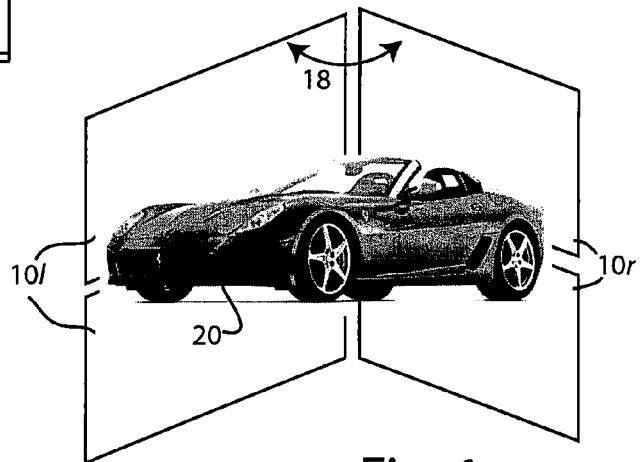

FIG. 1c shows yet another possible display ensemble configuration, where the displays are arranged in a series of panels, where the left-most panels 101 form an angle 18 with the right-most panels 10r. The displayed car image 20 is rendered properly, without distortion, notwithstanding the fact that the respective left and right panels are positioned at an angle to one another. This is because the system and method has been used to compute the transformation matrices needed to render the car 20 without distortion by compensation for the position and orientation of the respective displays.

Figure 1D:
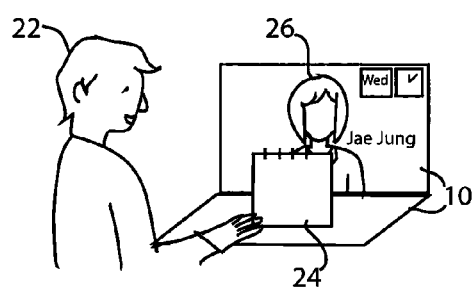

While the first three example use cases have featured uses that might be appropriate in large public spaces, the techniques described here are not limited to such applications. Thus, FIG. 1d shows another embodiment where two displays 10 are positioned at right angles to one another and serve as the display viewed by user 22 in a teleconferencing system. The image can be generated, as illustrated, to make it appear as if certain components are floating in front of other components. In the depicted illustration in FIG. 1d, a tablet 24 floats in front of the image 26 of the other communicating party, to simulate, for example, the parties' shared calendar.

Figure 2:
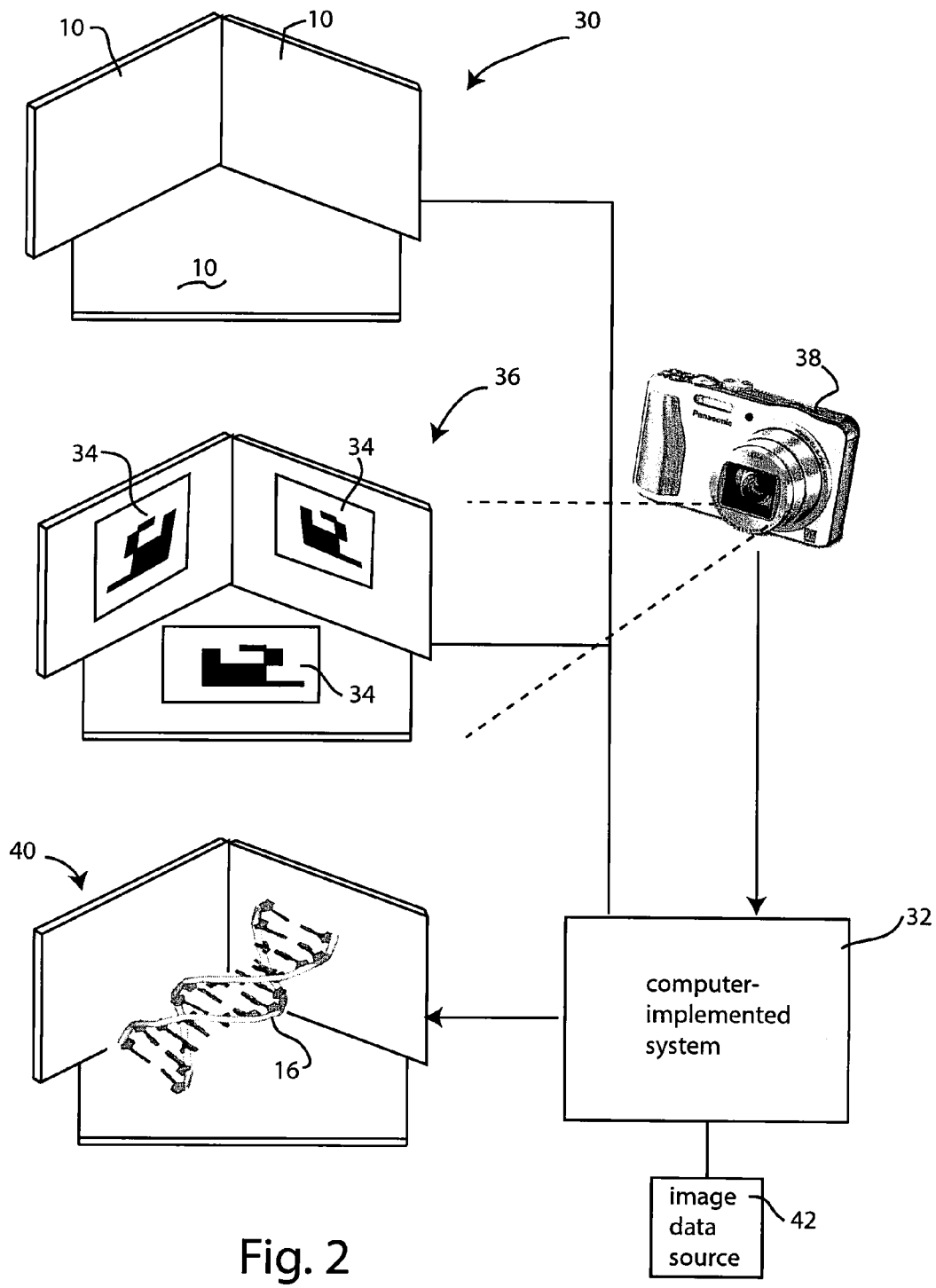
FIG. 2 is a block diagram overview of the method.

Referring now to FIG. 2, an overview of the method will be described. As depicted at 30, the ensemble of displays 10 is first set up by simply placing a plurality of monitors in any desired locations. Next, the computer-implemented system 32 (the details of which are described below) ascertains the resolution (e.g., pixels per centimeter) of each display and then generates for each display a QR code emblem 34 of known fixed size on each of the displays, as depicted at 36. Each QR code emblem encodes a unique display ID assigned to that monitor.

Next, a camera 38 captures one or more images of the display ensemble so that each of the QR code emblems is photographically captured in at least one image. If desired, the camera 38 can be activated automatically by system 32. The images obtained by the camera 38 are then sent to system 32 for further processing, as will be described. The camera 38 can be a still camera, taking one or more individual image frames, or it can be a video camera, capturing multiple frames in a time-synchronized sequence. Although the camera 38 has been illustrated in FIG. 2 as a handheld camera, the techniques described here can also be performed using cameras that are in fixed locations, including cameras that are incorporated into the displays themselves.

Next, as illustrated at 40, data for generating a displayed image is supplied from a data source 42 and then processed by the system 32 to allocate which portions of the image are to be shown on each of the displays, and further manipulating the data according to calculated transformation matrices so that the displayed image (e.g., DNA molecule 16) is rendered properly.

Figure 3:
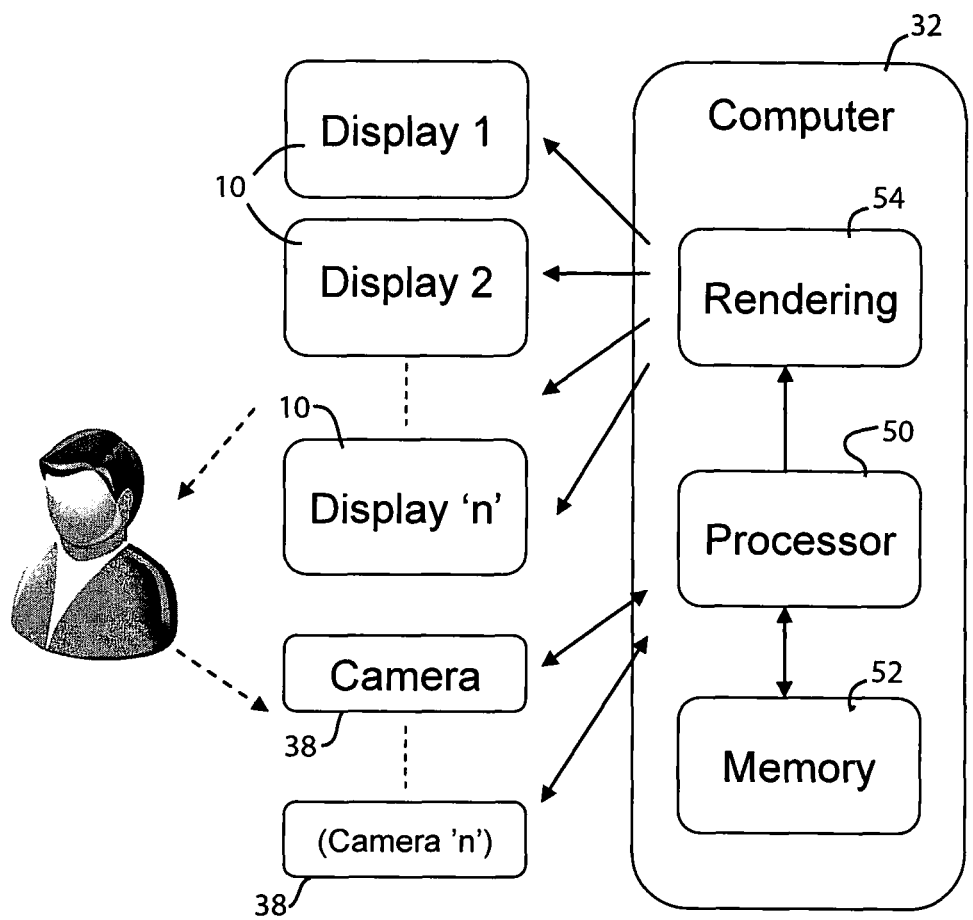
FIG. 3 is an overview flowchart and system block diagram of the system and method.

Referring to FIG. 3, the computer-implemented system 32 is shown in more detail. The system includes at least one processor 50 with associated memory 52. The processor computes the transformation matrices needed to properly display the image on plural displays 10 using a rendering algorithm 54. The processor communicates with the camera 38 (or with multiple cameras).

Figure 4:
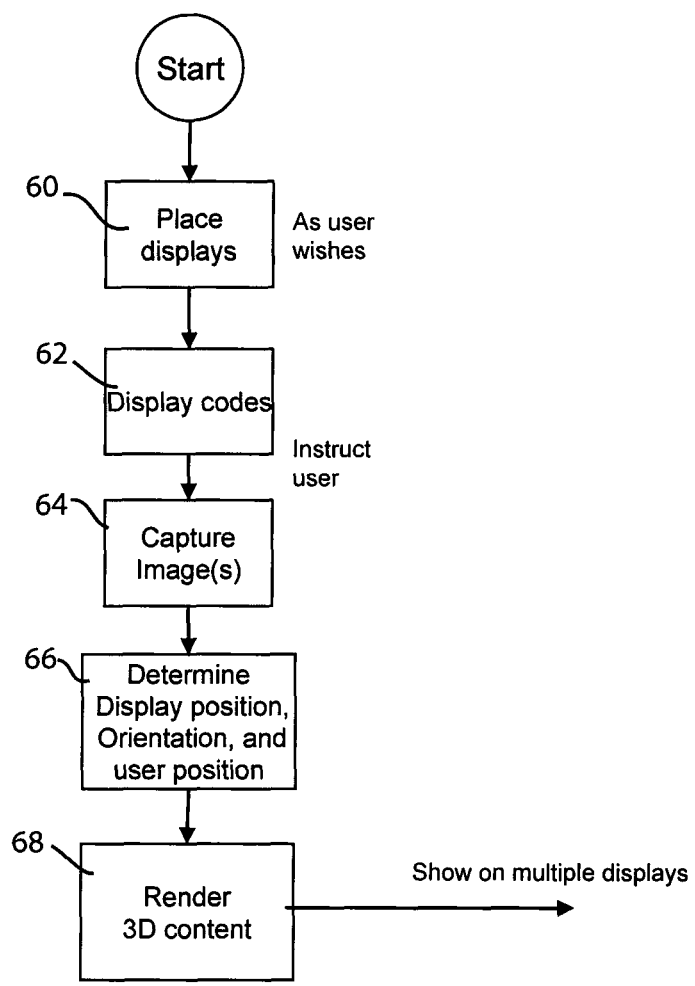
FIG. 4 is a more detailed flowchart showing the method.

The basic process according to the disclosed method will now be discussed in connection with FIG. 4. The method begins by placement of the displays as at step 60. The displays can be positioned anywhere the user wishes. Next (step 62), the processor ascertains the resolution of each monitor and then generates QR code emblems of a predetermined fixed size on each of the monitors. Each QR code corresponds to a unique ID assigned by the system 32 to each monitor. The resolution of each monitor is obtained by consulting lookup tables or by direct interrogation of the monitor hardware, and this information is used to calculate how many pixels are required by the monitor to produce a displayed image of the QR code emblem of a predetermined size. For example, the QR code emblem may be generated to have dimensions 10 centimeters by 10 centimeters on each of the displays. Displays having higher pixel-per-centimeter density will require a greater number of pixels in order to achieve the fixed size emblem.

Next (step 64), the camera or cameras are used to capture one or more images of the collective ensemble of displays, making sure that the QR code emblem for each display is fully visible in at least one of the images. Although the camera will likely be able to "see" the actual display devices themselves, the preferred embodiment bases its calculations on the QR code emblems, rather than the physical monitors, because the size and shape of these emblems are more reliably controlled by the system.

Next (step 66), the system determines the position and orientation of each display by analyzing the position and orientation of the QR code emblems as captured in the images at step 64. One embodiment for accomplishing this will be described below in connection with FIG. 7. In addition, at step 66 the user position is also determined, if needed, to generate 3D content. If 3D content is not being rendered (if the desired ensemble displays only a 2D image), then user position may not be necessary.

Finally (step 68), the content from the image data source 42 (FIG. 2) is now rendered and shown on the multiple displays within the ensemble.

Figure 5:
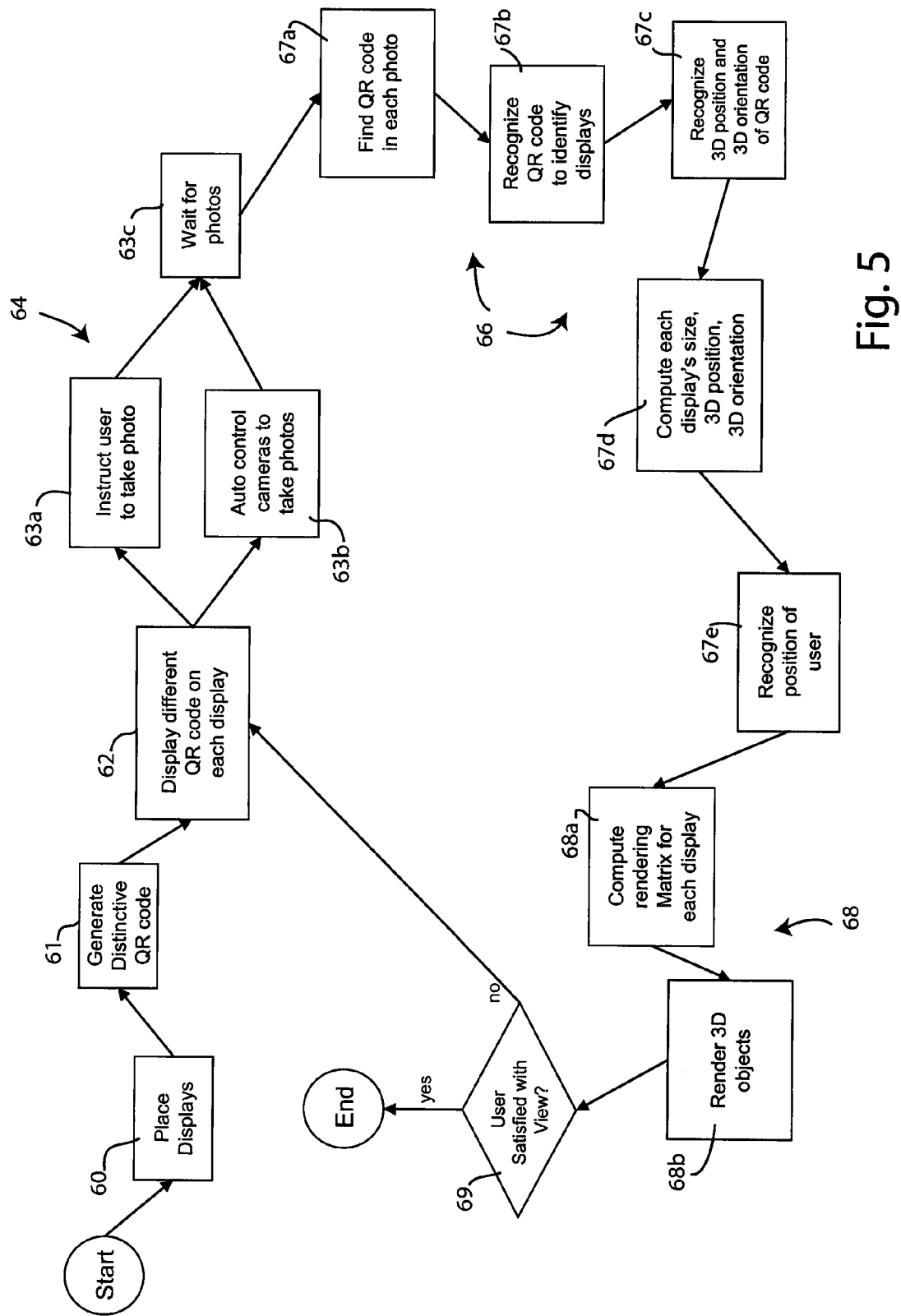
FIG. 5 is a further detailed flowchart of the method.

FIG. 5 shows the method in somewhat greater detail. FIG. 5 has been labeled, where applicable, to show the steps depicted in FIG. 4. FIG. 5 expands upon some of these steps, giving greater detail. Thus, after the display placement step 60, the system generates a distinctive QR code (step 61) for each display and these codes are then used (step 62) to display a different QR code on each display.

Next, in one embodiment, the system prompts the user to take a photo (step 63a) or, alternatively, automatically controls the camera to take the photo or photos (step 63b). The images are then captured in an image buffer as at 63c.

The determination of display position and orientation (step 66) involves first finding the QR code emblem in each photo (step 67a) and then recognizing the QR code to identify the display (step 67b) and then computing or recognizing the 3D position and 3D orientation of the QR code emblem (step 67c). From these data, each display's size, 3D position and 3D orientation are computed at 67d.

Then at step 67e, the position of the user is determined. This can be done, for example, by using the cameras mounted in the respective displays and then implementing a head-tracking algorithm (discussed in connection with FIG. 8).

Once the data have been gathered in the aforementioned steps, the system computes the rendering matrix or transformation matrix for each display, taking into account the size, position and orientation of each display as determined by the preceding steps. This is depicted at step 68a. Then, in step 68b, the objects are rendered in 3D by delivering the image data (processed by the transformation matrices) to the displays.

If desired, the process can be iteratively performed multiple times (as depicted at step 69) until the user is satisfied with the view.

To compute each display's size, 3D position and 3D orientation, the system draws a distinct two-dimensional QR code on each display. The system maintains a mapping of all pairs of these QR codes, along with the associated display ID assigned to each display. This has been illustrated diagrammatically in FIG. 6 at 70. This mapping of pairs may be stored, for example, in the memory 52 (FIG. 3) of the system. Later, when the images of the display ensemble are processed, each QR code located in the image (or images) is graphically identified and then used in a lookup process 72, which interrogates the data store of QR code-display ID mapping pairs 70 to identify the display ID of each QR code, as indicated at 74.

Figure 6:
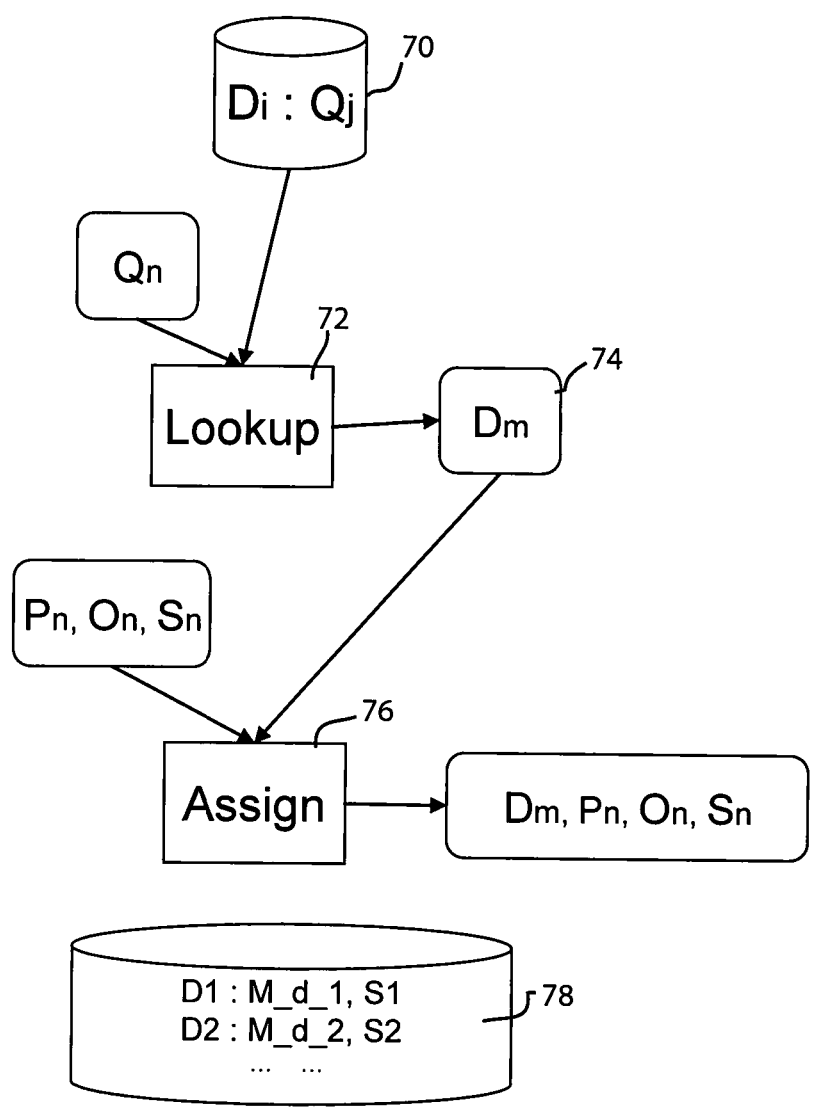
FIG. 6 is a data flow diagram illustrating assignment of the detected codes and computed position parameters.

Next, the position, orientation and size attributes (Pn, On, Sn) are computed as explained in connection with FIG. 7, and these computed data are then assigned to the electronic display device in association with its display ID. The assignment step is depicted in FIG. 6 at 76.

The preceding steps are performed for each of the detected QR codes, so that the display ID, position, orientation and size attributes for each display are obtained. These data are stored as at 78 as a 4×4 matrix that is used to construct the transformation matrices, which is in turn used to manipulate the source image data. The transformation matrix essentially maps the overall scene to be displayed onto the respective displays, assigning selective regions of the initial image to the display that lies in the region to which it is mapped. Thus, for example, using the image illustrated in FIG. 1a as an example, the globe 12 lies in the left-most region of the image and is thus mapped to the left-most display.

The transformation matrix takes into account not only position of the display (so as to place regions of the source image in the proper location) but also the resolution, size and orientation of each display. Size is taken into account by mapping onto the overall scene, the portion of that scene covered by each display. Orientation is taken into account to perform shearing and/or rotation transformation operations on the image date to, in effect, compensate for differences in angular orientation or attitude of one display relative to the others. Thus, if one display is angled relative to the others (as the right-most and left-most displays in FIG. 1a are angled relative to the center display), the angular distortions that would otherwise occur are removed by applying the appropriate shear and/or rotation processes on the data being routed to those angularly oriented displays.

Figure 7:
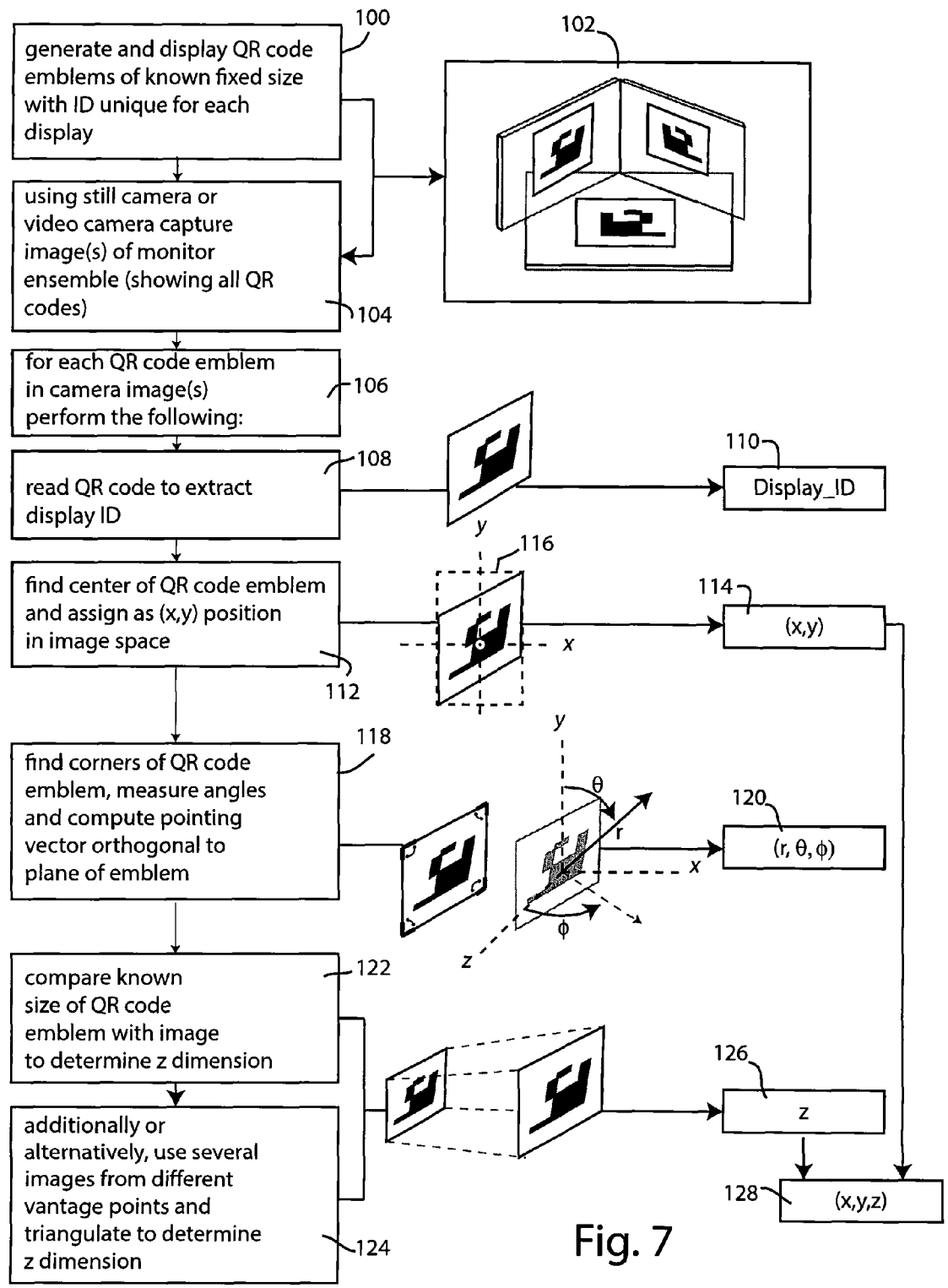
FIG. 7 is a flowchart illustrating one embodiment for calculating the monitor position and orientation.

Referring now to FIG. 7, one embodiment for ascertaining the display ID, position, orientation and size attributes will be described. Referring to FIG. 7 at step 100, the system generates and displays a QR code emblem of known fixed size with unique ID for each display, as diagrammatically shown at 102. Next, using a still camera or video camera, images of the ensemble are captured so that all of the QR code emblems are captured in at least one of the images (step 104). Then, for each QR code emblem in the camera image or images, the following steps are performed beginning at 106. The order of the steps performed is not essential. Thus, the depiction shown in FIG. 7 is merely intended as one example.

At step 108, the QR code is graphically identified by suitable means, such as by employing a color filter, a contrast filter or other image processing techniques. The code is then read or interrogated and the corresponding display ID is thus ascertained and stored at 110. As discussed in connection with FIG. 6, the display ID can be ascertained by performing a lookup which interrogates the stored mapping of pairs 70 (FIG. 6).

As illustrated at 112, the center of the QR code emblem is located and the location is assigned its (x,y) position in the image space and stored at 114. While there are several ways of determining the center of the QR code emblem, the embodiment illustrated in FIG. 7 places a bounding box 116 around the emblem and then subdivides the bounding box's horizontal and vertical sides to find the center where the subdivisions cross.

To find the orientation of the QR code emblem, the four corners of the QR code emblem are graphically identified and their respective angles are measured and used to compute the pointing vector that is orthogonal to the plane of the emblem (step 118). For example, if the four corners are all 90-degree angles, it is known that the emblem is facing directly towards the camera and thus the pointing vector would appear as a single point corresponding to the arrowhead of the vector. However, if the emblem is oriented at an angle, as illustrated in FIG. 7, the yaw and pitch of the emblem plane will correspond to a vector (r) pointing in a direction other than at the viewer's vantage point. Thus the vector is computed in relation to the reference frame and stored as at 120.

While the (x,y) position of the QR emblem has been assigned based on the center of the emblem (as at 114), the z axis dimension is separately computed either by comparing the known size of the QR code emblem with the captured image (step 122), by using multiple images and performing triangulation (step 124), or by using both techniques together. Ascertaining z dimension information from the size of the QR code emblem (step 122) takes into account the fact that the QR code image appears larger when it is closer to the camera. Thus, the relative size of the image can be used to determine the z axis information. The z axis information is thus captured and stored at 126 and then combined with the (x,y) position data to determine the (x,y,z) position of the monitor which is then stored at 128.

The size of the display can be determined by several different techniques. In one embodiment, the display size is known by the system, by utilizing lookup table data or by interrogation of the display attributes using the system calls of the computer operating system to which the display is attached. Alternatively, the display size can be ascertained by obtaining display size information in advance and then communicating it to the system 32 either by user input or by incorporating the information into the QR codes themselves. Finally, display size can also be determined graphically by displaying a graphical image that highlights the boundaries of the display and then measuring those boundaries. Other techniques are also possible.

Recognition of User Position

User position can be determined in 3D applications by employing at least one head-tracking camera designed to follow a known indicia on the 3D glasses of the user. In one embodiment, a camera is positioned in the display ensemble, such as a camera disposed in one or more of the display devices. The camera is trained in the direction of the user and can be configured to respond to a selective wavelength or group of wavelengths of light reflected from the 3D glasses of the user. For example, the monitor may be provided with an infrared illumination source that illuminates the user's eyeglasses, reflecting from a mirrored spot or other structured configuration on the eyeglass frames. The camera then detects the reflected infrared light, identifies the structured spot or other predefined structured configuration and uses this to ascertain the location of the glasses. The position of the user's left and right eyes can then be calculated based on the detected structured reflected light.

Figure 8:
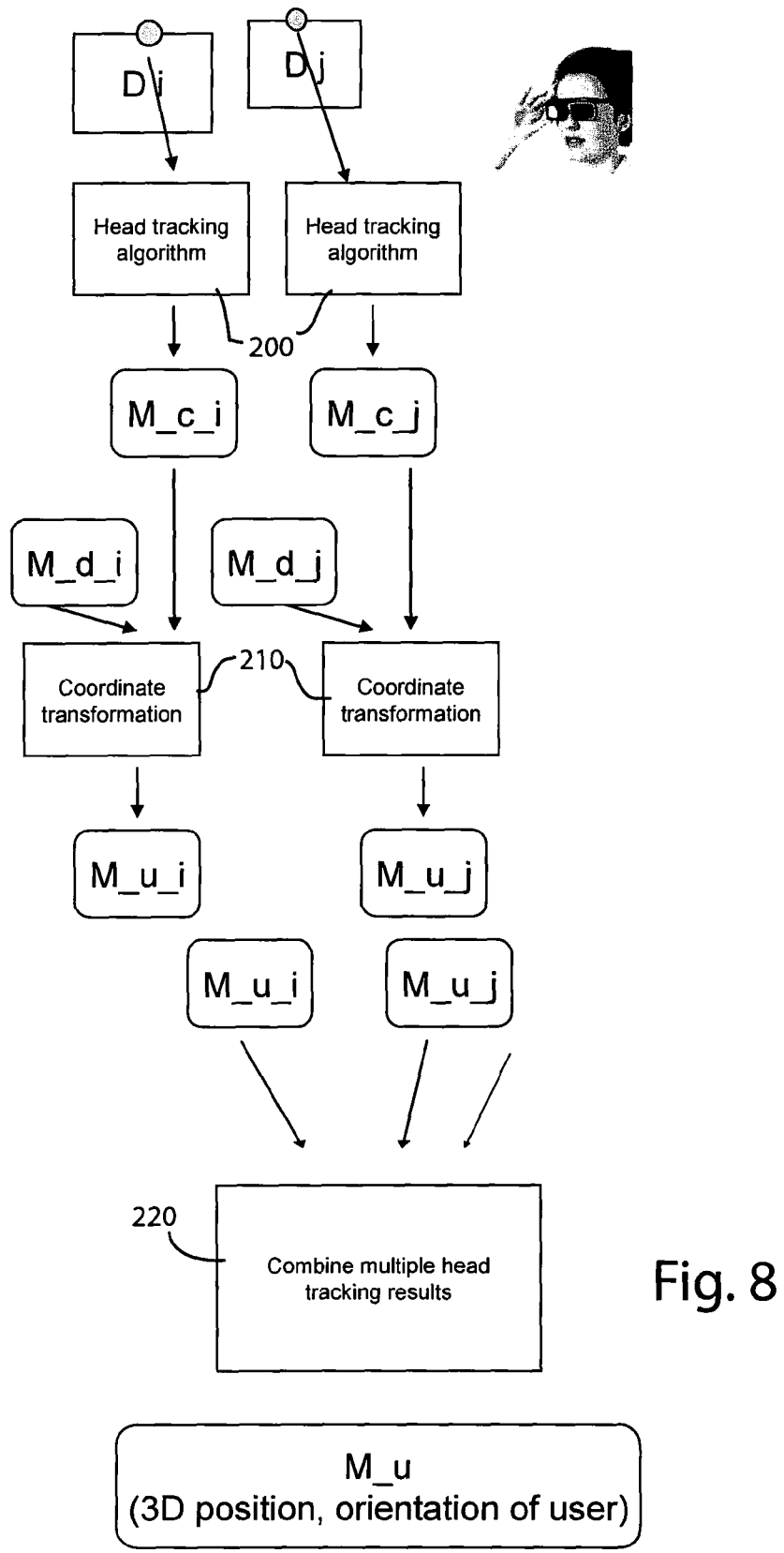
FIG. 8 is a flowchart depicting how the monitor position and orientation data are used in combination with a head-tracking algorithm.

In one preferred embodiment, plural such head-tracking systems are employed. For example, several (or all) of the monitors in the ensemble can be provided with head-tracking cameras and the data from each of these are processed in parallel, as shown in FIG. 8, by employing a head-tracking algorithm 200 on each reflected light data stream. Each head-tracking algorithm 200 generates a 4×4 matrix based on the camera data [M_c_i]. Then, a 4×4 matrix calculated by the process illustrated in FIG. 6 [M_d_i] is fed to the coordinate transformation algorithm 210 to generate a transformed 4×4 matrix [M_u_i]. These transformed data are then fed to process 220 where the data from multiple data streams are combined. The end result is a matrix [M_u] representing the 3D position and orientation of the user. The combining algorithm combines the results of the respective data streams using a weighted average. The weighting factors are based on each tracking system's reported tracking confidence according to the following equation:

$$M = \Sigma w_i M u_i$$

$w_i \propto$ confidence reported by tracking system

Computing 3D Rendering Matrix for Each Display

Figure 9:
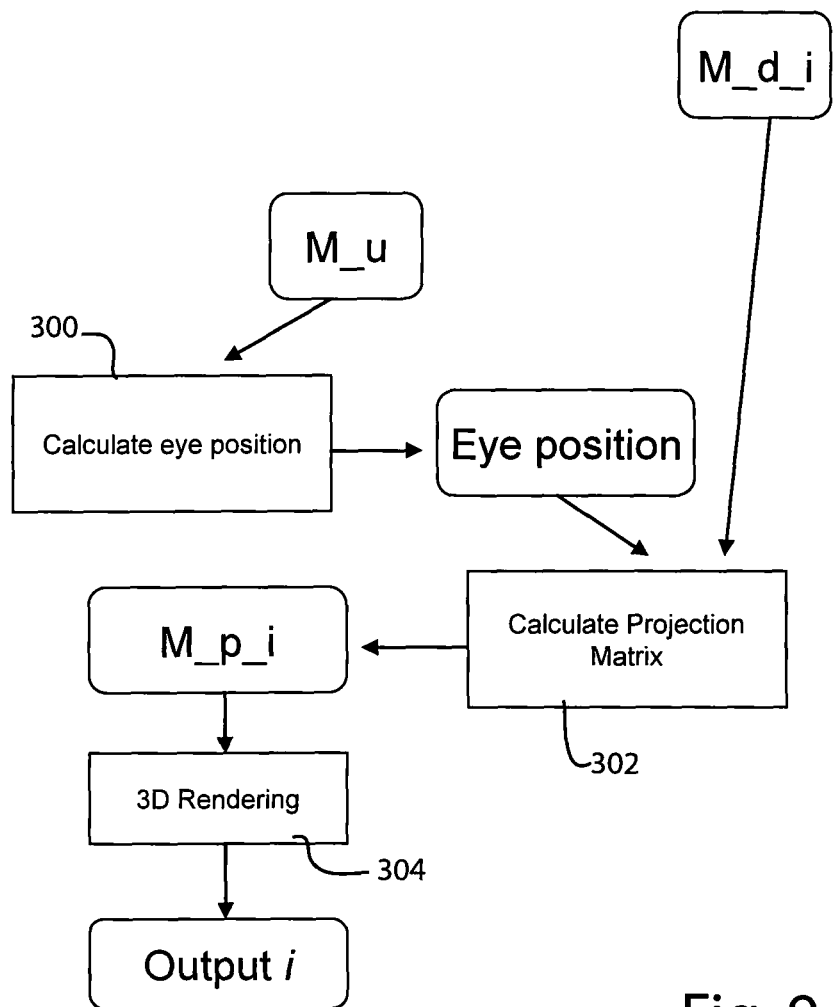
FIG. 9 is a flowchart depicting the 3D rendering matrix and its computation.

As depicted in FIG. 9, the 3D rendering matrix for each display is computed by using the user position matrix [M_u] and the display matrix [M_d_i]. These data are used to calculate the eye position using algorithm 300 to operate on the user position matrix data and using algorithm 302 to calculate the projection matrix using the calculated eye position and also using the display matrix data [M_d_i]. The calculated projection matrix [M_p_i] is then fed to the 3D rendering algorithm 304 which then outputs the data to the display for viewing.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for presenting information across multiple electronic displays, comprising:
    arranged to define a non-coplanar ensemble;
    generating and displaying on each display a uniquely encoded emblem of predetermined size and shape that encodes a unique identifier for that display;
    optically capturing at least one digital image of the ensemble so that the encoded emblem for each display is captured from a vantage point spaced apart from the ensemble, the optically captured image having a captured size that varies from the predetermined size based on distance from vantage point to ensemble and having a captured shape that has foreshortened dimensions across the line of sight between vantage point and ensemble;
    defining a reference coordinate system corresponding to the space occupied by the ensemble of electronic displays;
    processing each of the captured encoded emblem images to extract the following attributes:
        a) unique identifier of the display;
        b) position of the encoded emblem relative to the reference coordinate system; and
        c) three-dimensional orientation of the encoded emblem relative to the reference coordinate system, where the three-dimensional orientation is computed using the captured size and shape;
    supplying the information to be presented as image data to be displayed across the ensemble of displays; and
    collectively processing the attributes for each of the encoded emblem images to compute for each display a transformation matrix that selects a portion of the image data for display on that monitor and that performs three-dimensional orientation correction so that the information presented on that display appears spatially consistent with the information presented on the other displays.

2. The method of claim 1 wherein said generating and displaying on each display a uniquely encoded emblem step is performed by generating and displaying an encoded emblem of known size and shape.

3. The method of claim 1 wherein said unique identifier is expressed using a machine-readable code.

4. The method of claim 1 wherein said unique identifier is expressed using a QR code.

5. The method of claim 1 wherein said step of capturing at least one digital image is performed using a still camera.

6. The method of claim 1 wherein said step of capturing at least one digital image is performed using a video camera.

7. The method of claim 1 wherein said step of capturing at least one digital image is performed by using a processor programmed to control a camera.

8. The method of claim 1 wherein the position attribute is extracted using graphical processing to locate the center of the emblem.

9. The method of claim 1 wherein the three-dimensional orientation attribute is extracted using graphical processing to locate and measure angles defined by edges of the emblem.

10. The method of claim 1 wherein the position attribute is extracted using graphical processing to locate the center of the emblem and using this center as x,y coordinates that are projected into said reference coordinate system.

11. The method of claim 1 further comprising generating and displaying on each display a uniquely encoded emblem of predetermined fixed size and shape.

12. The method of claim 11 further comprising:
using a camera to capture at least one image of the encoded emblem;
using graphical processing to determine the size of the captured encoded emblem;
comparing the size of the captured encoded emblem with said predetermined fixed size to determine a parameter indicative of distance from the camera to the displayed encoded emblem; and
using said parameter indicative of distance as a z coordinate of said position attribute.

13. The method of claim 1 further comprising:
using a camera to capture multiple images of the encoded emblem for each display, where at least some of the multiple images are taken from different vantage points relative to the space occupied by the ensemble; and
processing the multiple images by triangulation to determine the position attribute in the reference coordinate system.

14. The method of claim 1 wherein the reference coordinate system is a three-dimensional reference system.

15. The method of claim 1 wherein said step of supplying information to be presented comprises generating different information for each of a viewer's left and right eyes.

16. The method of claim 15 further comprising providing said displays with at least one associated camera that captures information indicative of the location of a user while viewing said ensemble and using said user location information to modify said data streams to account for the position of the user's left and right eyes.

17. The method of claim 15 further comprising providing at least a plurality of said displays each with an associated camera that captures information indicative of the location of a user while viewing said ensemble and combining the information indicative of the location of a user from said associated cameras into a single user head-tracking estimate.

18. The method of claim 17 wherein said combining step is performed by generating weighting factors based on head-tracking confidence from each associated camera and applying said weighting factors when combining the information indicative of user location from each of said associated cameras.

19. The method of claim 1 wherein said step of supplying information to be presented comprises generating different information data streams for each of a viewer's left and right eyes; and applying said transformation matrix separately to each of said data streams.

20. A method for ascertaining the positions and orientations of a plurality of electronic displays arranged in a non-coplanar ensemble, comprising:
generating and displaying on each display a uniquely encoded emblem of predetermined size and shape that encodes a unique identifier for that display;
optically capturing at least one digital image of the ensemble so that the encoded emblem for each display is captured from a vantage point spaced apart from the ensemble, the optically captured image having a captured size that varies from the predetermined size based on distance from vantage point to ensemble and having a captured shape that has foreshortened dimensions across the line of sight between vantage point and ensemble;
defining a reference coordinate system corresponding to the space occupied by the ensemble of electronic displays;
processing each of the captured encoded emblem images to extract the following attributes:
 a) unique identifier of the display;
 b) position of the encoded emblem relative to the reference coordinate system; and
 c) three-dimensional orientation of the encoded emblem relative to the reference coordinate system, where the three-dimensional orientation is computed using the captured size and shape; and
supplying the information to be presented as image data to be displayed across the ensemble of displays.

21. An apparatus for presenting information across multiple electronic displays that are arranged as a non-coplanar ensemble, comprising:
a processor programmed to generate a uniquely encoded emblem of predetermined size and shape that encodes a unique identifier for each display, the processor having associated graphics circuitry to send the encoded emblem to the display for visual presentation;
a camera positioned to optically capture at least one digital image of the ensemble so that the encoded emblem for each display is captured from a vantage point spaced apart from the ensemble, the optically captured image having a captured size that varies from the predetermined size based on distance from vantage point to ensemble and having a captured shape that has foreshortened dimensions across the line of sight between vantage point and ensemble;
the processor being programmed to define a reference coordinate system corresponding to the space occupied by the ensemble of electronic displays;
the processor being further programmed to process each of the captured encoded emblem images to extract the following attributes:
 a) unique identifier of the display;
 b) position of the encoded emblem relative to the reference coordinate system; and
 c) three-dimensional orientation of the encoded emblem relative to the reference coordinate system, where the three-dimensional orientation is computed using the captured size and shape;
the processor having an input port to receive the information to be presented as image data to be displayed across the ensemble of displays; and
the processor being programmed to collectively process the attributes for each of the encoded emblem images to compute for each display a transformation matrix that selects a portion of the image data for display on that monitor and that performs three-dimensional orientation correction so that the information presented on that display appears spatially consistent with the information presented on the other displays.

* * * * *